United States Patent
Otis et al.

(10) Patent No.: US 9,786,155 B2
(45) Date of Patent: Oct. 10, 2017

(54) EMPLOYING OFFSETS TO CREATE MULTIPLE ORTHOGONAL CHANNEL SEQUENCES IN FREQUENCY HOPPING SYSTEMS

(71) Applicant: Honeywell International Inc., Morristown, NJ (US)

(72) Inventors: Jesse J. Otis, North Haven, CT (US); Andrew G. Berezowski, Wallingford, CT (US); Gourav Sharma, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/008,088

(22) Filed: Jan. 27, 2016

(65) Prior Publication Data
US 2017/0213446 A1    Jul. 27, 2017

(51) Int. Cl.
*G08B 25/10* (2006.01)
*G08B 25/14* (2006.01)
*H04B 1/713* (2011.01)
*H04B 1/7143* (2011.01)

(52) U.S. Cl.
CPC ............. *G08B 25/10* (2013.01); *G08B 25/14* (2013.01); *H04B 1/713* (2013.01); *H04B 1/7143* (2013.01)

(58) Field of Classification Search
CPC ............ H04B 1/7143; H04W 72/0446; H04W 72/0453; H04W 72/082; G08B 19/005; G08B 13/2491; G08B 21/22; H04L 12/2803
See application file for complete search history.

(56) References Cited

U.S. PATENT DOCUMENTS

| 7,295,109 B2 * | 11/2007 | Kobayashi | G08B 13/1966 340/539.21 |
| 2005/0055568 A1 * | 3/2005 | Agrawala | G07C 9/00111 726/2 |
| 2005/0122948 A1 | 6/2005 | Miyazaki | |

(Continued)

FOREIGN PATENT DOCUMENTS

WO    2005/034378 A1    4/2005

OTHER PUBLICATIONS extended European search report from corresponding EP patent application 17151265.0, dated Jul. 6, 2017.

*Primary Examiner* — Mirza Alam
(74) *Attorney, Agent, or Firm* — Husch Blackwell LLP

(57) ABSTRACT

A system is provided that includes a control panel of a security system, a memory of the security system having a reference frequency hopping pattern and a reference frequency offset saved therein, a plurality of wireless threat sensors that communicate with the control panel using the reference frequency hopping pattern and a fixed frequency offset for each frequency and each hop of the reference frequency hop pattern, wherein the fixed frequency offset is an integer multiple of the reference frequency offset, and a processor of the security system that detects any nearby security systems that use the reference frequency hopping pattern, determines the integer multiple of the reference frequency offset used by each of the nearby security systems, and sets the fixed frequency offset used by the plurality of sensors at a selected integer multiple of the reference frequency offset that is not used by any nearby security system.

21 Claims, 2 Drawing Sheets

(56) References Cited

U.S. PATENT DOCUMENTS

| | | | |
|---|---|---|---|
| 2006/0145842 A1* | 7/2006 | Stilp | G05B 9/03 340/539.22 |
| 2008/0211668 A1* | 9/2008 | Dixon | B65D 90/00 340/541 |
| 2012/0319844 A1* | 12/2012 | van Doorn | G01S 13/003 340/541 |
| 2014/0269842 A1* | 9/2014 | Lacatus | H04B 1/7156 375/134 |
| 2015/0163814 A1 | 6/2015 | Kore et al. | |

* cited by examiner

EMPLOYING OFFSETS TO CREATE MULTIPLE ORTHOGONAL CHANNEL SEQUENCES IN FREQUENCY HOPPING SYSTEMS

FIELD

This application relates to security systems and, more particularly, to wireless security systems.

BACKGROUND

Systems are known to protect people and assets within secured areas. Such systems are typically based upon the use of one more sensors that detect threats within the areas.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within an area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied, and additional sensors may be placed within an interior of the space and used when the space is not occupied.

In most cases, threat detectors are connected to a local control panel. In the event of a threat detected via one of the detectors, the control panel may sound a local audible alarm. The control panel may also send a signal to a central monitoring station.

While conventional security systems work well, they are often subject to interference from nearby security systems. Accordingly, a need exists for better methods and an apparatus for detecting and ameliorating interference.

DETAILED DESCRIPTION

Figure 1:
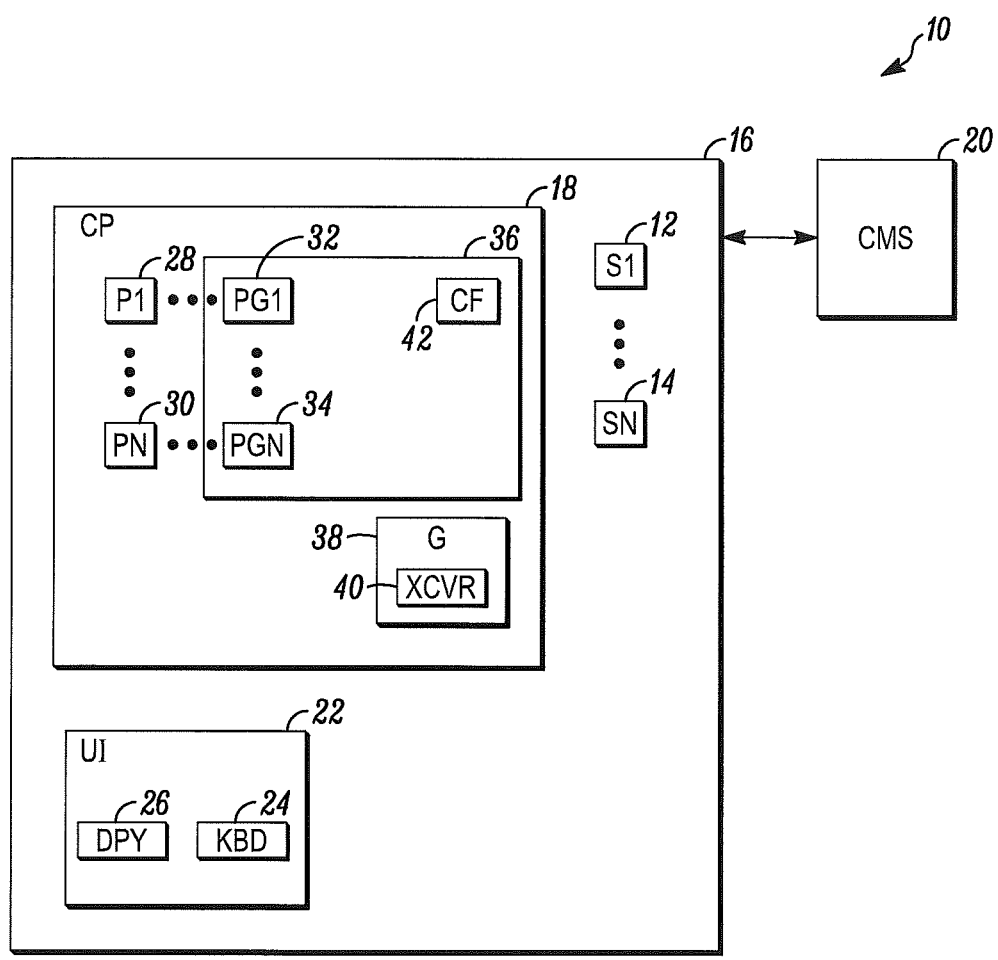
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the security system may be a number of sensors 12, 14 that detect threats within a secured geographic area 16. The threat sensors may be embodied in any of a number of different forms. For example, at least some of the sensors may be limit switches placed on the doors and/or windows providing entrance into or egress from the secured area. Other of the sensors may be passive infrared (PIR) sensors placed within the interior of the area and intended to detect intruders who have been able to circumvent the sensors along the periphery. Still other of the sensors may be closed circuit television (CCTV) cameras with motion detection capabilities.

Alternatively, some of the threat sensors may be environmental sensors. For example, the sensors may be fire detectors (e.g., smoke, heat, etc.) or gas detectors (e.g., carbon monoxide, natural gas, etc.).

The sensors may be monitored by a control panel 18 located within the secured area as shown in FIG. 1 or located remotely (e.g., a cloud based application). Upon detection of the activation of one of the sensors, the control panel may send an alarm message to a central monitoring station 20. The monitoring station may respond by summoning help (e.g., the police, the fire department, etc.).

The security system may be controlled via a user interface 22. In this regard, an authorized human user may enter a personal identification number (PIN) and activate a function key through a keyboard 24 to arm and disarm the system. Status information may be shown on a display 26.

Included within the control panel, the user interface, and each of the sensors is circuitry that accomplishes the functionality described herein. The control circuitry may include one or more processor apparatus (processors) 28, 30 each operating under control of one or more computer programs 32, 34 loaded from a non-transitory computer readable medium (memory) 36. As used herein, reference to a step performed by a computer program is also reference to the processor that executed that step.

For example, a status processor may monitor the user interface for status instructions. Upon entry of a PIN and an arm instruction (or simply an arm instruction), the status processor may assume an armed state. Similarly, entry of a PIN and a disarm instruction causes the status processor to enter a disarmed state.

Similarly, an alarm processor may monitor the status processor and, in the armed or armed away state, monitor the sensors. Upon detecting activation of a sensor, the alarm processor may compose the alarm message for transmission to the central monitoring station. The alarm message may include an identifier of the secured area (e.g., an address, account number, etc.), the type of sensor, an identifier of the sensor, a location of the sensor, and a time of activation.

Also included within the control panel and sensors are one or more processors that may form a wireless mesh network. In this regard, the control panel and sensors may operate under a time division multiple access (TDMA) format. Alternatively or in addition, the control panel and sensors may use frequency hopping based upon a predefined reference frequency hopping sequence. A communication file 42 within the control panel and each of the wireless sensors defines a communication superframe through which communications occur between each of the sensors and the control panel through one or more TDMA slots of the superframe.

The sensors of the security system may be synchronized to the superframe (and control panel) via a beacon transmitted by the control panel. The beacon may be transmitted by a synchronization processor through a radio frequency transceiver 40 that may be contained within a communication gateway 38. The beacon identifies the security system and provides a summary and temporal location of the superframe to each sensor. For example, the summary may identify a first portion (e.g., a frame) of the superframe used by sensors to transmit messages to the control panel, a second portion (e.g., frame) used by the control panel to transmit messages to each of the sensors, and a third portion (e.g., frame) for use by a newly activated sensor to send registration messages to the control panel.

For example, upon activation of a sensor (or upon the initial start-up of the security system), a registration processor (and corresponding radio frequency transceiver) within each sensor operates by tuning to a predetermined spectrum and searching for a beacon. Upon detecting and decoding the beacon, the sensor confirms that the beacon is from the proper control panel (i.e., security system) and identifies the portion of the superframe that the newly activated sensor would use to transmit registration messages to the control panel.

Once identified, the sensor sends a registration message to the control panel. The control panel receives the registration message, decodes it, authenticates the sensor, and assigns the sensor to a specific set of transmit and receive slots for communicating with the control panel. The sensor synchronizes to the assigned slots and forms a communication connection with the control panel through the radio frequency transceiver.

Upon activation, each sensor attempts to form a direct connection with the radio frequency transceiver. A direct connection, in this case, means that the connection is not formed through any other sensor. If a sensor cannot form a direct connection, then the sensor forms the connection through a parent sensor under a parent child relationship.

Figure 2:
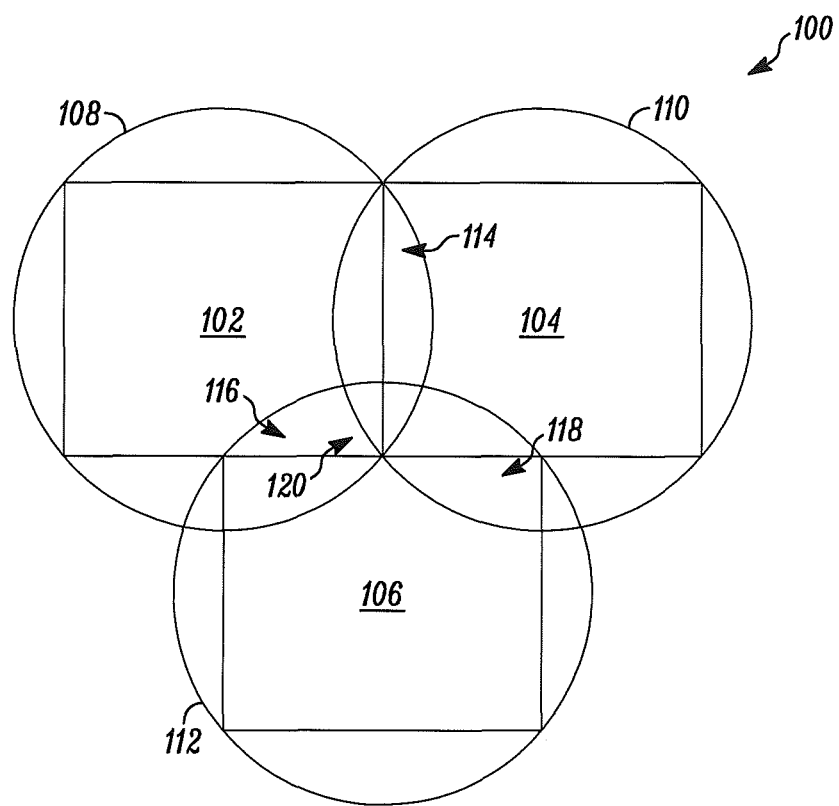
FIG. 2 illustrates a system of a plurality of security systems, including the security system of FIG. 1.

Under the illustrated embodiment, a number of the security systems shown in FIG. 1 could be used in relatively close proximity without interference. For example, FIG. 2 depicts three closely spaced secured geographic areas 102, 104, 106. Associated with each of the secured geographic areas is a circle that represents a radio frequency service coverage area 108, 110, 112 of the corresponding security system. As shown in FIG. 2, service coverage areas 102 and 106 have an overlapping region 116, service coverage areas 102 and 104 have an overlapping region 114, and service coverage areas 104 and 106 have an overlapping region 118. Service coverage areas 102, 104, and 106 also have an area 120 where all three overlap.

In order to avoid mutual interference among the coverage areas, each security system may use the reference frequency hopping sequence under a system that avoids the simultaneous use of the same frequency by more than one of the security systems.

Under the embodiment, frequency assignment based upon use of the reference frequency hopping sequence occurs at start-up. In this case, the first security system (e.g., 102) to be activated scans a predetermined spectrum for the beacons of other nearby security systems. If the system fails to identify any other security systems in the area, the system adopts the reference frequency hopping sequence without any modification. The first security system also incorporates a notification into its beacon that announces that it is using the reference frequency hopping sequence with an integer multiple of zero.

Upon the activation of a second security system, the system scans the spectrum and detects the beacon of the first security system. The second system determines that the first system is using the reference frequency hopping sequence. In response, the second system adopts a frequency hopping sequence based upon the reference frequency hopping sequence by adding a fixed frequency offset to each respective frequency of the reference frequency hopping sequence. Under one embodiment, the fixed frequency offset may be an integer multiple of the normal channel spacing within the system. For example, if the first security system uses a reference frequency hopping sequence including a channel sequence of 1, 2, 3, 4, 5 and the second security system uses an integer multiple of one, then the second security system would use the channel sequence of 2, 3, 4, 5, 6 using a common time base. In each case, the security systems modify their beacons to announce the integer multiple of the reference frequency offset used by the system.

In addition to scanning for nearby security systems in order to determine a frequency offset used by the nearby systems, each scanning security system also synchronizes its temporal location within the sequence to any detected neighbor. In the example immediately above, this would result in the first system using channel one while the second system uses channel two in the first step of the frequency hopping sequence.

In general, regulatory requirements mandate that frequency hopping systems require a unique channel sequence to ensure avoidance of interference from other systems using the same frequency band. Multiple systems may end up colliding in time and frequency so a method of avoidance needs to be implemented that will yield the largest number of non-overlapping sequences. The system of FIGS. 1 and 2 utilize a novel technology for exchanging sequence and seed information between adjacent networks without co-operation while ensuring that the maximum number of adjacent systems are permitted without overlap and interference.

Some prior systems (developed by some of the inventors of this system) have demonstrated the ability of sharing a seed number that is used to generate a pseudo-random hop sequence and its location in the array of the frequency hopping sequences. The systems of FIGS. 1 and 2 use the same hop sequence from one network to the next and use it to generate a substantially identical hop sequence, wherein each channel number of the adjacent system is offset by a value that may be determined by the adjacent channel rejection capabilities of the radio/system.

For example, a master network (security system) with a generated channel sequence of 2, 19, 12, 25, 1 will be detected and used by a first overlapping network to create a substantially identical sequence and offset each value by three, resulting in a non-overlapping channel sequence of 5, 22, 15, 2, 4. The next overlapping network will be offset by 6, resulting in a channel sequence of 8, 25, 18, 5, 7. The value of the offset corresponds to the channel separation required to ensure data reception during simultaneous transmission. The offset correction will "wrap-around" when the value exceeds the maximum number of channels available in the sequence.

Previous work by the same inventors has described a scanning feature that identifies neighboring networks. This scan routine is an exhaustive scan finding all neighboring networks, existing and new. The scan repeats periodically. The systems of FIGS. 1 and 2 use a shorter, more frequent scan in order to identify and correct drift compensation and to maintain tighter network to network synchronization. The shorter scan is only used by networks that have been previously identified and uses the network information captured earlier in the standard scanning routine. The shorter scan offers the benefit of reduced battery consumption and tighter synchronization. The times at which a shorter scan would be executed is independently determined and shared as part of the beacon message from the existing networks.

In general, the system includes a control panel of a security system that detects threats within a secured geographic area, a memory of the security system having a reference frequency hopping pattern and a reference frequency offset saved therein, a plurality of wireless threat sensors of the security system located within the secured area that communicate with the control panel using the reference frequency hopping pattern with a fixed frequency offset for each frequency and each hop of the reference frequency hop pattern, wherein the fixed frequency offset is an integer multiple of the reference frequency offset, and a processor of the security system that detects any nearby security systems using the reference frequency hopping pattern, that determines the integer multiple of the reference frequency offset used by each of the nearby security systems, and that sets the fixed frequency offset used by the plurality of sensors at a selected integer multiple of the reference frequency offset that is not used by any nearby security system.

Alternatively, the system includes a plurality of security systems that each detect threats within a respective secured geographic area, a respective control panel of each of the plurality of security systems, the respective control panel being located within the secured area of the security system, a respective memory of each of the control panels having a reference frequency hopping pattern and a reference frequency offset saved therein, a respective plurality of wireless sensors of each of the respective secured areas that detect threats and that communicate with the control panel using the reference frequency hopping pattern or using the reference frequency hopping pattern along with a fixed frequency offset for each frequency and each hop of the reference frequency hop pattern, wherein, the fixed frequency offset is an integer multiple of the reference frequency offset, and a respective processor of each of the plurality of security systems that detects any nearby security system of the plurality of security systems using the reference frequency hopping pattern by itself or with an integer multiple offset, that determines the integer multiple of the reference frequency offset used by each of the nearby security systems, and that sets the fixed frequency offset used by the plurality of sensors of the security system at a selected integer multiple of the reference frequency offset that is not used by any nearby security system.

Alternatively, the system includes a plurality of security systems that each detect threats within a respective secured geographic area, a respective control panel of each of the plurality of security systems, the respective control panel being located within the secured area of the security system, a respective memory of each of the control panels having a reference frequency hopping pattern and a reference frequency offset saved therein, a respective mesh network of wireless sensors of each of the respective secured areas, wherein the wireless sensors detect threats and communicate with the respective control panel through the mesh network using the reference frequency hopping pattern or using the reference frequency hopping pattern along with a fixed frequency offset for each frequency and for each hop of the reference frequency hop pattern, wherein the fixed frequency offset is an integer multiple of the reference frequency offset, and a respective processor of each of the plurality of security systems that detects any nearby security system of the plurality of security systems, that determines the integer multiple of the reference frequency offset used by each of the nearby security systems, and that sets the fixed frequency offset used by the respective mesh network at a selected integer multiple of the reference frequency offset that is not used by any nearby security system of the plurality of security systems.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
    a control panel of a security system that detects threats within a secured geographic area;
    a memory of the security system having a reference frequency hopping pattern and a reference frequency offset saved therein;
    a plurality of threat sensors of the security system located within the secured geographic area that communicate with the control panel using a modified frequency hopping pattern; and
    a processor of the security system that detects any nearby security systems that use any integer multiple variant of the reference frequency hopping pattern and that determines respective integer multiples of the reference frequency offset used by each of the nearby security systems, and
    wherein the processor of the security system determines a subsequent integer multiple different than the respective integer multiples, and
    wherein the processor of the security system sets the modified frequency hopping pattern by adding a product of the reference frequency offset and the subsequent integer multiple to each frequency of the reference frequency hopping pattern.

2. The apparatus as in claim 1 further comprising a processor of the control panel that transmits a beacon that synchronizes each of the plurality of threat sensors with the control panel.

3. The apparatus as in claim 1 further comprising a processor of a first threat sensor of the plurality of threat sensors that transmits a beacon that synchronizes each of the plurality of threat sensors with the first threat sensor.

4. The apparatus as in claim 3 further comprising a processor of the control panel that incorporates an identifier of the reference frequency hopping pattern and the subsequent integer multiple into the beacon.

5. The apparatus as in claim 2 further comprising a timing file saved within the memory that defines a repeating superframe, wherein the beacon synchronizes each of the plurality of threat sensors to a reference location within the superframe.

6. The apparatus as in claim 5 wherein the control panel and the plurality of threat sensors further comprise a time division multiple access communication system.

7. The apparatus as in claim 1 wherein the processor of the security system determines the subsequent integer multiple to be zero when no nearby security systems are found that are using any integer multiple variant of the reference frequency hopping pattern.

8. The apparatus as in claim 1 wherein the processor of the security system determines a highest relative integer value of the respective integer multiples.

9. The apparatus as in claim 8 wherein the processor of the security system determines the subsequent integer multiple by adding a value of one to the highest relative integer value.

10. The apparatus as in claim 1 wherein the reference frequency offset includes a channel spacing.

11. An apparatus comprising:
a plurality of security systems, wherein each of the plurality of security systems detects threats within a respective secured geographic area;
a respective control panel of each of the plurality of security systems, wherein the respective control panel of each of the plurality of security systems is located within the respective secured geographic area;
a respective memory of the respective control panel of each of the plurality of security systems, wherein the respective memory of the respective control panel of each of the plurality of security systems includes an identical reference frequency hopping pattern and an identical reference frequency offset saved therein;
a respective plurality of sensors of the respective secured geographic area of each of the plurality of security systems that detect the threats and that communicate with the respective control panel of each of the plurality of security systems using a respective modified frequency hopping pattern; and
a respective processor of each of the plurality of security systems that detects any nearby security systems of the plurality of security systems that use an integer multiple variant of the identical reference frequency hopping pattern, determines respective integer multiples of the identical reference frequency offset used by each of the nearby security systems, determines a respective subsequent integer multiple different than the respective integer multiples, and sets the respective modified frequency hopping pattern by adding a product of the identical reference frequency offset and the respective subsequent integer multiple to each frequency of the identical reference frequency hopping pattern.

12. The apparatus as in claim 11 further comprising a respective processor of the respective control panel of each of the plurality of security systems that listens for a beacon transmitted by a master security system of the plurality of security systems and that synchronizes a respective one of the plurality of security systems to the master security system.

13. The apparatus as in claim 11 further comprising a respective processor of the respective control panel of one of the plurality of security systems transmitting a beacon that synchronizes each of the respective plurality of sensors with the respective control panel of the one of the plurality of security systems.

14. The apparatus as in claim 13 wherein the respective processor of the respective control panel of the one of the plurality of security systems incorporates an identifier of the identical reference frequency hopping pattern and the respective subsequent integer multiple into the beacon.

15. The apparatus as in claim 11 further comprising a respective processor of a first sensor of the respective plurality of sensors transmitting a beacon that synchronizes each of the respective plurality of sensors with the first sensor.

16. The apparatus as in claim 15 wherein each of the respective plurality of sensors includes a respective mesh network.

17. The apparatus as in claim 16 wherein the respective mesh network of each of the respective plurality of sensors includes a respective repeating superframe, and wherein the beacon synchronizes the respective mesh network of each of the respective plurality of sensors to a respective reference location within the respective repeating superframe.

18. The apparatus as in claim 11 wherein the respective processor of each of the plurality of security systems determines the respective subsequent integer multiple to be zero when no nearby security systems are found using any integer multiple variant of the identical reference frequency hopping pattern.

19. The apparatus as in claim 11 wherein the respective processor of each of the plurality of security systems determines a highest relative integer value of the respective integer multiples.

20. The apparatus as in claim 19 wherein the respective processor of each of the plurality of security systems determines the respective subsequent integer multiple by adding a value of one to the highest relative integer value.

21. An apparatus comprising:
a plurality of security systems, wherein each of the plurality of security systems detects threats within a respective secured geographic area;
a respective control panel of each of the plurality of security systems, wherein the respective control panel is located within the respective secured geographic area;
a respective memory of the respective control panel of each of the plurality of security systems having an identical reference frequency hopping pattern and an identical reference frequency offset saved therein;
a respective mesh network of wireless sensors of the respective secured geographic area of each of the plurality of security systems, wherein respective ones of the wireless sensors detect threats and communicate with the respective control panel of each of the plurality of security systems through the respective mesh network using a respective modified frequency hopping pattern; and
a respective processor of each of the plurality of security systems that detects any nearby security system of the plurality of security systems and determines respective integer multiples of the identical reference frequency offset used by each of the nearby security systems,
wherein the respective processor of each of the plurality of security systems determines a respective subsequent integer multiple different than the respective integer multiples, and
wherein the respective processor of each of the plurality of security systems sets the respective modified frequency hopping pattern by adding a product of the identical reference frequency offset and the respective subsequent integer multiple to each frequency of the identical reference frequency hopping pattern.

* * * * *